US010097126B2

(12) United States Patent
Millett

(10) Patent No.: US 10,097,126 B2
(45) Date of Patent: Oct. 9, 2018

(54) METHOD AND APPARATUS TO CHANGE RESONANCE FREQUENCY OF AN ELECTRONIC DEVICE

(71) Applicant: INTEL CORPORATION, Santa Clara, CA (US)

(72) Inventor: Howard D. Millett, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/034,961

(22) PCT Filed: Dec. 27, 2013

(86) PCT No.: PCT/US2013/078124
§ 371 (c)(1),
(2) Date: May 6, 2016

(87) PCT Pub. No.: WO2015/099792
PCT Pub. Date: Jul. 2, 2015

(65) Prior Publication Data
US 2016/0276972 A1    Sep. 22, 2016

(51) Int. Cl.
*H02P 25/032* (2016.01)
*G01H 13/00* (2006.01)
(Continued)

(52) U.S. Cl.
CPC .............. *H02P 25/032* (2016.02); *G01H 1/00* (2013.01); *G01H 13/00* (2013.01); *G06F 3/00* (2013.01); *G08B 6/00* (2013.01); *H02P 6/006* (2013.01)

(58) Field of Classification Search
CPC ........ H02P 25/027; H02N 2/14; H02K 33/00; H02K 33/02; F04B 35/045
(Continued)

(56) References Cited

U.S. PATENT DOCUMENTS

2011/0102162 A1* 5/2011 Gregorio .................. G06F 3/016
340/407.2
2011/0204830 A1    8/2011 Kim et al.
(Continued)

FOREIGN PATENT DOCUMENTS

EP    2216899 A2    8/2010
JP    2013-109429 A    6/2013

OTHER PUBLICATIONS

Written Opinion and International Search Report for PCT/US2013/078124 dated Sep. 24, 2014.
(Continued)

*Primary Examiner* — Kawing Chan
*Assistant Examiner* — Bradley Brown
(74) *Attorney, Agent, or Firm* — Schwabe, Williamson & Wyatt, P.C.

(57) ABSTRACT

An electronic device may include a motor to operate at a first frequency during a first time period and to operate at a second frequency during a second time period, and an accelerometer to obtain first data relating to operation of the motor at the first frequency and to obtain second data relating to operation of the motor at the second frequency. The electronic device may also include a processor to determine a desired resonant frequency of the motor based on the first data and the second data.

20 Claims, 4 Drawing Sheets

(51) Int. Cl.
    *G08B 6/00*         (2006.01)
    *G06F 3/00*         (2006.01)
    *H02P 6/00*         (2016.01)
    *G01H 1/00*         (2006.01)

(58) Field of Classification Search
    USPC .......................................................... 318/114
    See application file for complete search history.

(56) References Cited

U.S. PATENT DOCUMENTS

| | | |
|---|---|---|
| 2012/0250889 A1 | 10/2012 | Millett |
| 2013/0264973 A1 | 10/2013 | Garg et al. |
| 2014/0028221 A1* | 1/2014 | Cohen ............... H04M 1/72569 |
| | | 318/114 |
| 2015/0070261 A1* | 3/2015 | Saboune ................. G06F 3/016 |
| | | 345/156 |

OTHER PUBLICATIONS

Texas Instruments, Haptic Driver with Auto Resonance Tracking for Linear Resonance Actuators (LRA) and Optimized Drive for Eccentric Rotating Mass Actuators (ERM), DRV2603 SLOS786—Apr. 2012 (7 pages).

\* cited by examiner

METHOD AND APPARATUS TO CHANGE RESONANCE FREQUENCY OF AN ELECTRONIC DEVICE

CROSS-REFERENCE TO RELATED PATENT APPLICATIONS

This application is a U.S. National Stage Application under 35 U.S.C. § 371 of PCT Application No. PCT/US13/078124, filed Dec. 27, 2013, whose entire disclosure is hereby incorporated by reference.

BACKGROUND

1. Field Embodiments may relate to a resonance of an electronic device.

2. Background

An electronic device may include a haptic device. Haptics may enhance a user experience by relating to touch by a user. Haptics may refer to a sense of touch of the electronic device.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Embodiments may relate to changing a resonance (or resonant frequency) of an electronic device.

The electronic device may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), and/or etc. For ease of description, the following may relate to an electronic device such as a mobile terminal.

Figure 1:
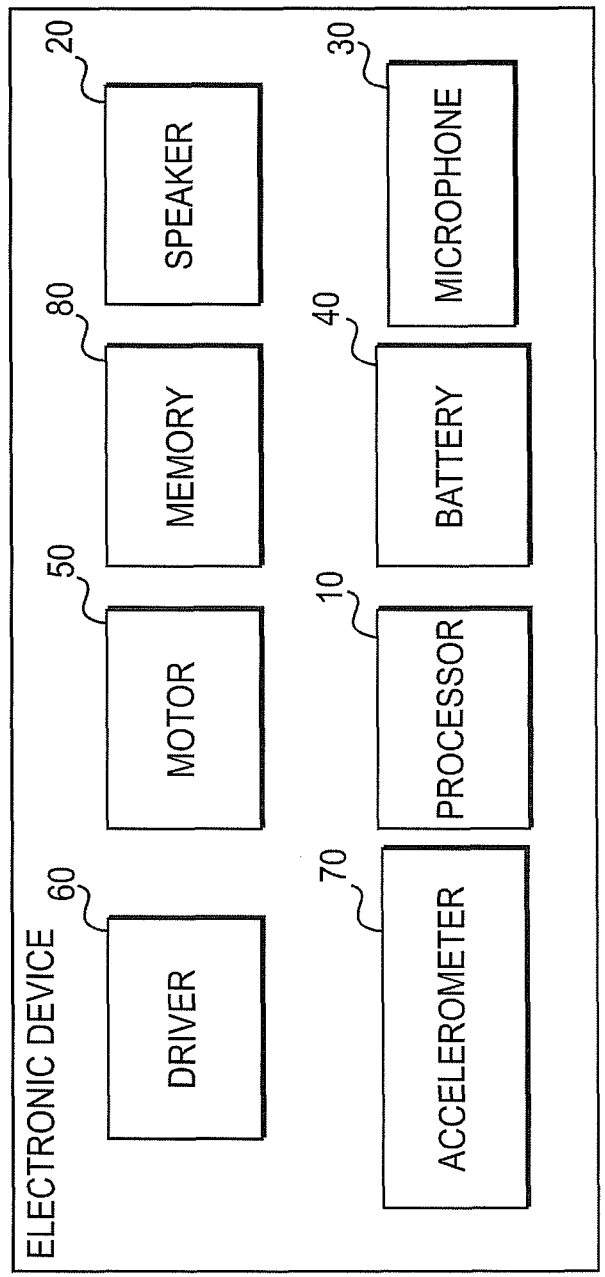
FIG. 1 is a diagram of an electronic device according to an example arrangement.

FIG. 1 is diagram of an electronic device according to an example arrangement. Other arrangements may also be provided.

An electronic device may include many electronic components. FIG. 1 shows a processor 10, a speaker 20, a microphone 30, a battery 40 (such as in a battery port), a motor 50 (or haptic device), a driver 60, an accelerometer 70 (or accelerometer device), and a memory 80. Other components may also be provided.

As one example, the motor 50 may be a linear resonance actuator (LRA) (or linear resonance actuator device) or a linear resonance motor. The LRA may be a spring mass system that oscillates in a linear motion.

The motor 50 may be controlled by the driver 60, which may receive signals from the processor 10. The motor 50, such as the LRA, may be used for haptic feedback in the electronic device. The motor 50 may provide a haptic event, such as a vibration at a resonant frequency, for example. The motor 50 may operate in a narrow frequency band. The motor 50, or LRA, may have a narrow operating bandwidth centered on a resonant frequency. However, a resonant frequency of the motor 50 may change (or drift) over time due to any of a number of factors such as age, angle, or process variation. As one example, the LRA resonant frequency may vary due to any of a number of external factors including mounting position and acceleration.

Embodiments may utilize an accelerometer (or accelerometer device) and a process (or algorithm) to determine the motor's desired (or optimal) resonant frequency as the frequency changes to above an ideal frequency and/or below an ideal frequency. As a resonant frequency changes (either above or below the ideal frequency), then the process may identify a new optimal (or desired) resonant frequency to operate the motor 50. As used hereinafter, the optimal resonant frequency may be a desired resonant frequency.

The accelerometer 70 may measure or determine acceleration forces. For example, the accelerometer 70 may detect (or determine) magnitude and/or a direction of acceleration (or g-force). The accelerometer 70 may measure or monitor vibrations and/or a vibration frequency at the electronic device. In at least one embodiment, the accelerometer 70 may measure or monitor vibrations and/or a vibration frequency of the motor 50, such as the LRA.

The accelerometer 70 along with the processor 10 may operate to determine and monitor the resonant frequency of the motor 50. For example, the operating resonant frequency of the motor 50 (or the electronic device) may increase over time or may decrease over time. The accelerometer 70 and the processor 10 may determine a new operating resonant frequency (or desired resonant frequency) of the motor 50 by monitoring the different resonant frequencies.

The accelerometer 70 may monitor a resonant frequency at a specific frequency.

In at least one embodiment, the accelerometer may obtain first data relating to operation of the motor at the first frequency (e.g. first resonant frequency data) and obtain second data relating to operation of the motor at the second frequency (e.g. second resonant frequency data). The accelerometer may also obtain third resonant frequency data of the motor at the third frequency. Additional data may also be obtained.

Figure 2:
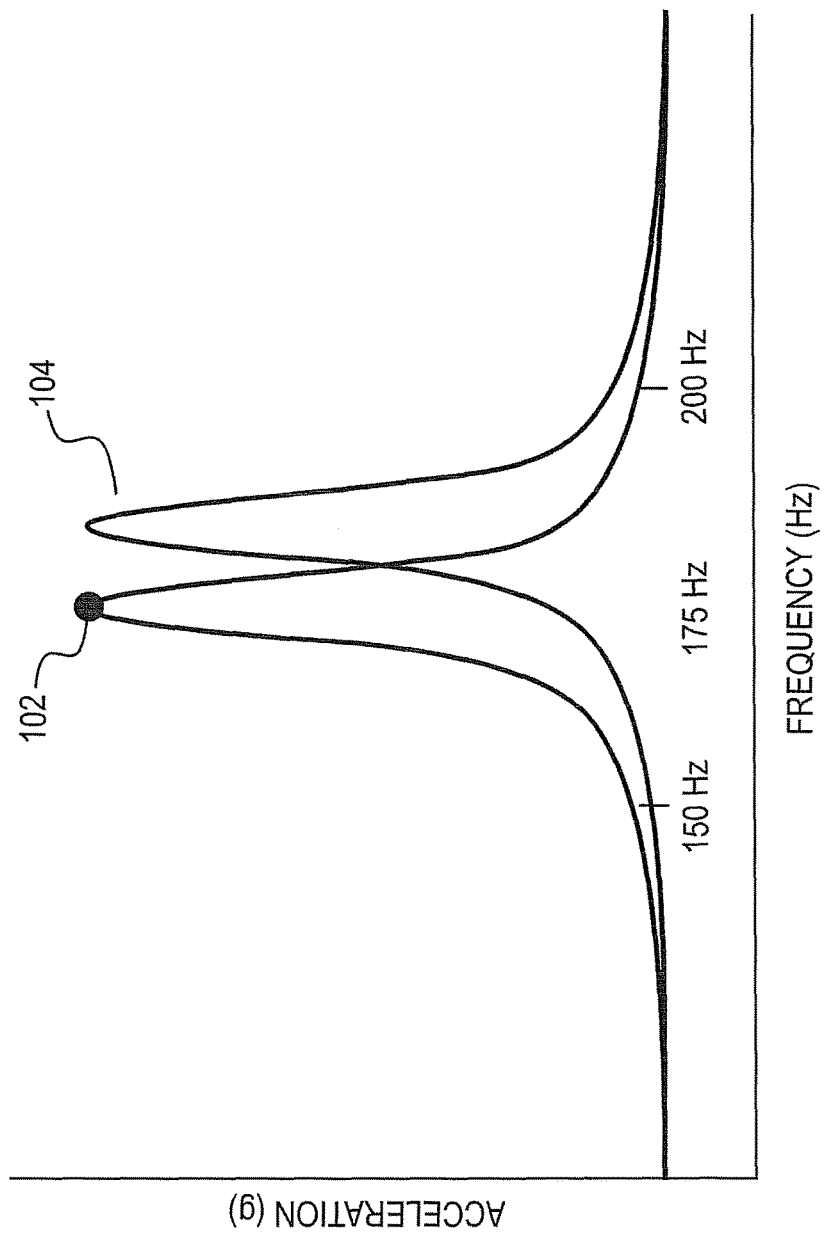
FIG. 2 is a graph showing frequency versus acceleration according to an example arrangement.

FIG. 2 is a graph showing frequency versus acceleration according to an example arrangement. Other graphs, data and arrangements may also be provided.

FIG. 2 is a graph showing a resonance frequency (Hz) along an X-axis and acceleration (g) along a Y-axis. The graph may represent data that is determined, obtained and/or monitored by the accelerometer 70 and/or the processor 10.

As one example, line 102 of the graph may represent an ideal (or desired optimal) resonant frequency (or first resonant frequency) at approximate 175 Hz, which is the operating frequency of the motor 50. As another example, line 104 of the graph may represent an ideal (or desired optimal) resonant frequency of the same motor but has shifted due to age, temperature, change in mass, or some other factor. In this example, the difference between the first resonant frequency and the second resonant frequency may be an 80% loss in acceleration of the motor 50.

The difference between the line 102 and the line 104 may represent a resonance frequency drift. The resonance frequency drift may cause a loss in vibration performance of the motor 50 (such as the LRA).

The processor 10 may receive data, from the accelerometer 70, regarding the resonant frequency. The data may be stored in the memory 80, for example. The processor 10 may store different resonant frequency data over time.

The motor 50 may be controlled by the driver 60. As one example, a speed (or frequency) of the motor 50 may be controlled to operate at different frequencies. Resonant frequency data may be collected and stored at that time (i.e., in real time). For example, the processor 10 may operate to store data regarding frequency and acceleration magnitude of the motor 50.

The processor may determine a desired resonant frequency of the motor based on the first data and the second data.

Figure 3:
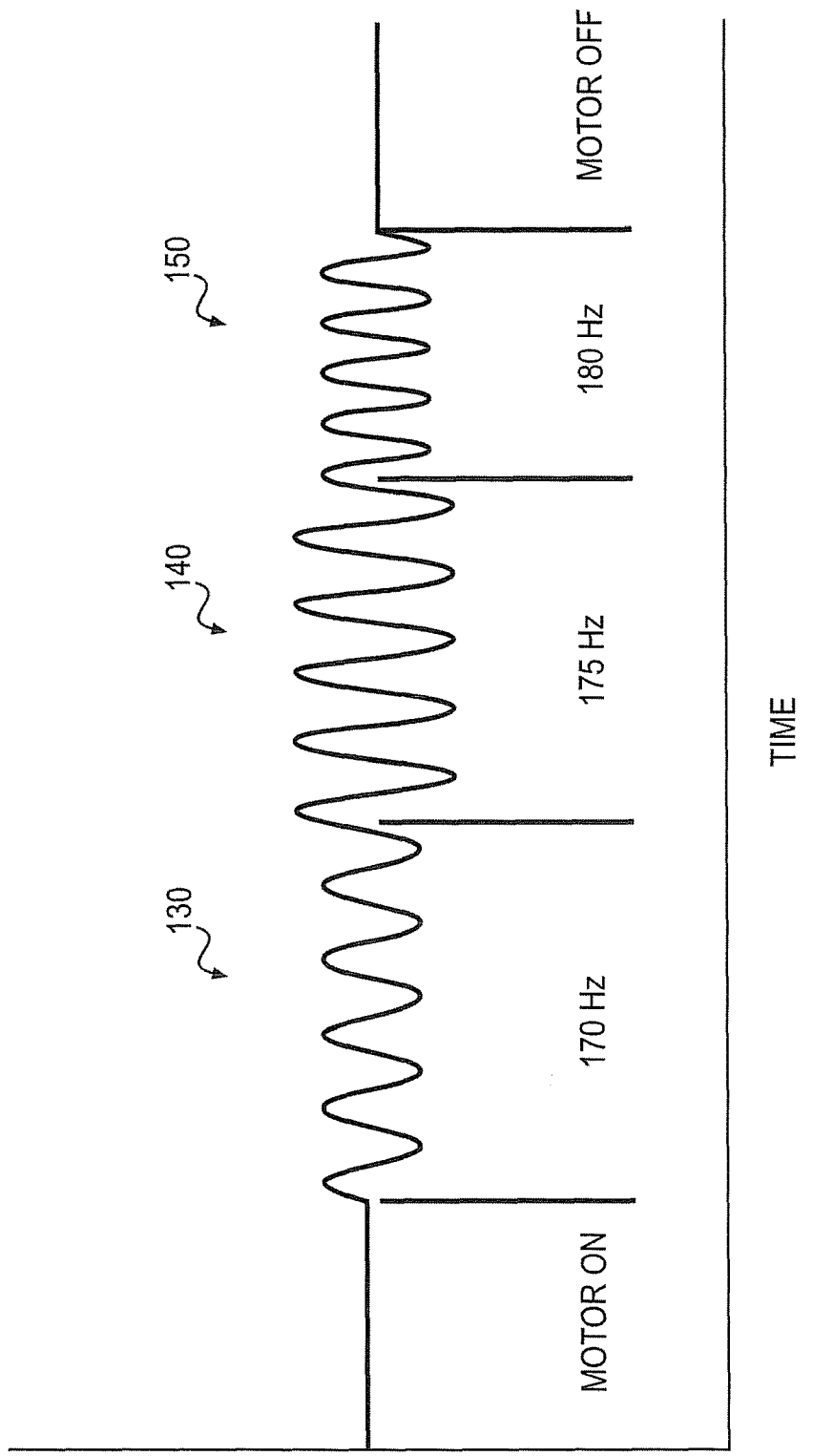
FIG. 3 is a graph showing time versus system vibration according to an example embodiment.

FIG. 3 is a graph showing time versus system vibration according to an example arrangement. Other graphs, data and arrangements may also be provided.

FIG. 3 is a graph showing a time along an X-axis and a system vibration (from the accelerometer 70) along a Y-axis. The graph may represent data that is determined or monitored by the accelerometer 70 and/or the processor 10.

FIG. 3 shows system vibration over different time periods, namely a first time period 130, a second time period 140 and a third time period 150.

As shown in FIG. 3, during the first time period 130, the motor 50 may operate at a 170 Hz frequency. The FIG. 3 graph shows the system vibration during the first time period 130.

During the second time period 140, the motor 50 may operate at a 175 Hz frequency. The FIG. 3 graph shows the system vibration during the second time period 140.

During the third time period 150, the motor 50 may operate at a 180 Hz frequency. The FIG. 3 graph shows the system vibration during the third time period 150.

The motor may operate at a first frequency during a first time period, operate at a second frequency during a second time period and operate at a third frequency during a third time period.

The FIG. 3 graph may represent data that is obtained and stored. Based on this stored data, a determination may be made regarding the ideal or desired resonant frequency of the motor 50. For example, in the FIG. 3 graph, a resonant frequency during the time period 140 may represent the ideal (or desired/optimal) resonant frequency. The determination of the ideal or desired resonance may be a selection of a resonance that yields a best acceleration as a next resonant frequency.

Figure 4:
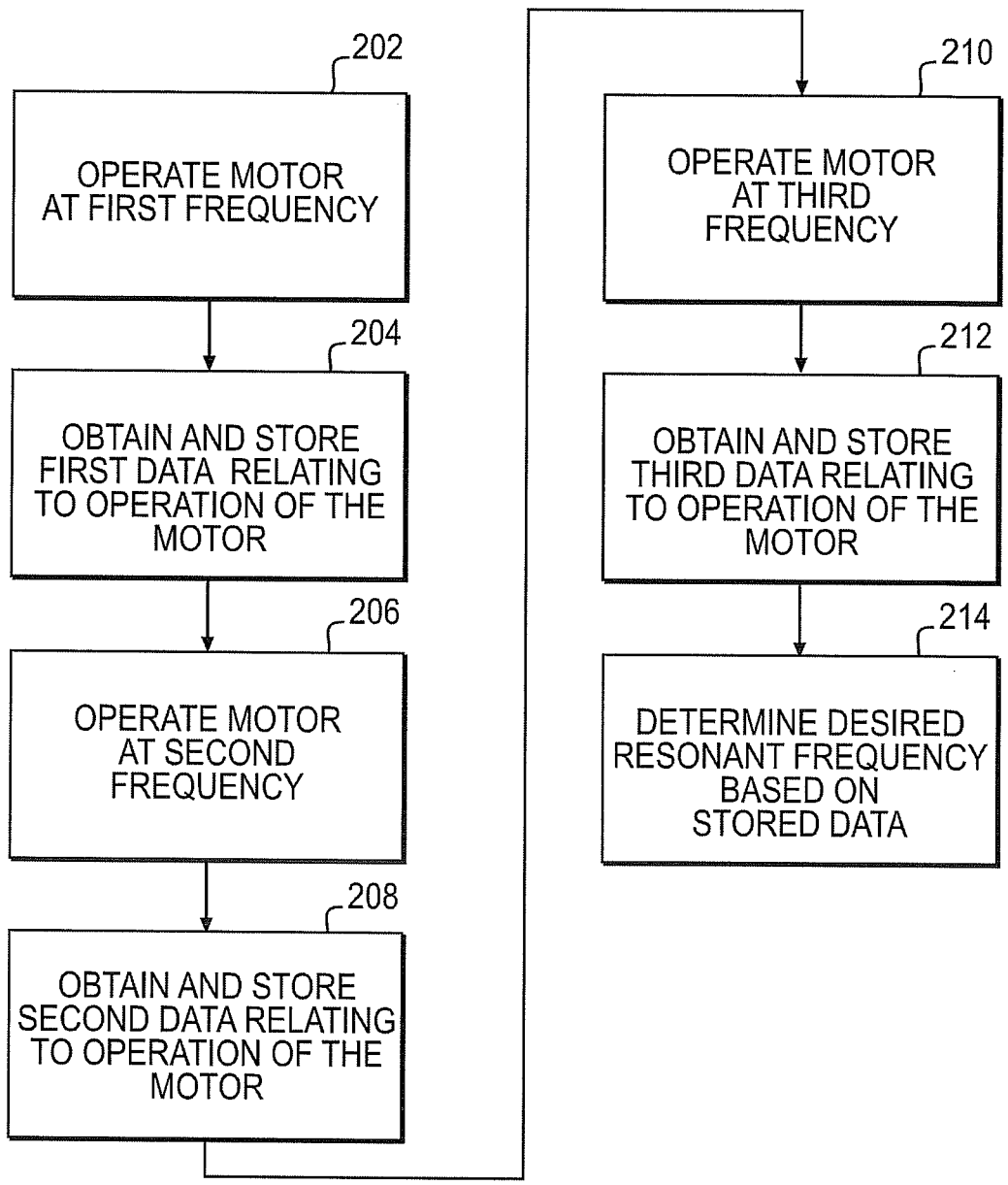
FIG. 4 is a flowchart showing a methodology of determining a desired (or optimal) resonant frequency of an electronic device.

FIG. 4 is a flowchart showing a methodology of determining a desired (or optimal) resonant frequency of an electronic device according to an example embodiment. Other operations, orders of operations and embodiments may also be provided.

More specifically, FIG. 4 shows that a motor may operate at a first frequency in operation 202. For example, the motor 50 (or LRA) may operate at a 170 Hz frequency. In operation 204, the electronic device may obtain and store first data relating to operation of the motor while the motor 50 is operating at the first frequency (i.e., first resonant frequency data).

In operation 206, the motor may operate at a second frequency. In operation 208, the electronic device may obtain and store second data relating to operation of the motor while the motor 50 is operating at the second frequency (i.e., second resonant frequency data).

After the second data (while operating at the second frequency) has been obtained and stored, a frequency of the motor 50 may change. The change may be made by the driver 60 (and/or the processor 10). The motor 50 may therefore operate at a third frequency in operation 210. For example, the motor 50 (or LRA) may operate at a 180 Hz frequency. In operation 212, the electronic device may obtain and store third data relating to operation of the motor while the motor 50 is operating at the third frequency (i.e., third resonant frequency data).

In operation 214, the desired (or optimal) resonant frequency may be determined, by the processor 10, based on the stored data (i.e., the first data, the second data and the third data). Based on the stored data, the processor 10 may determine the ideal (or desired) resonant frequency.

After determining a desired resonant frequency of the motor based on frequency data, the motor may operate at the desired resonant frequency. This may include controlling a driver of the motor based on the determined desired resonant frequency. This may include providing a haptic event, such as providing a vibration at the electronic device.

In at least one embodiment, a computer-readable medium may store a program for controlling circuitry to provide the methodology shown in FIG. 4. The circuitry may be controlled to control the motor (e.g. the LRA) based on the determined (desired/optimal) resonant frequency. The program may be stored in a system memory, which for example, may be internal or external to the electronic device. In at least one embodiment, the program may be part of a control algorithm for controlling operations of the electronic device.

Instructions or code executed by the processor may be provided to a memory from a machine-readable medium, or an external storage device accessible via a remote connection (e.g. over a network via an antenna and/or network interface) providing access to one or more electronically-accessible media, etc. A machine-readable medium may include any mechanism that provides (i.e., stores and/or transmits) information in a form readable by a machine (e.g., a computer). For example, a machine-readable medium may include random access memory (RAM), read only memory (ROM), magnetic or optical storage medium, flash memory devices, electrical, optical, acoustical or other form of propagated signals (e.g., carrier waves, infrared signals, digital signals), etc. In alternative embodiments, hard-wired circuitry may be used in place of or in combination with the instructions or code, and thus the embodiments are not limited to any specific combination of hardware circuitry and software instructions.

The program may include code or instructions to perform any of the operations or functions performed in embodiments previously discussed above.

Elements of the above described embodiments may be provided in code segments or instructions to perform tasks. The code segments or tasks may be stored in a processor readable medium or transmitted by a computing data signal in a carrier wave over a transmission medium or communication link. The processor readable medium, machine readable medium or computer readable medium may include any medium that can store or transfer information. Examples of the processor readable medium, machine readable medium or computer readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The data signal may include any signal that can propagate over a transmission medium such as electronic network channels, optical fibers, air, electromagnetic, radio frequency (RF) links, etc. The code segments or instructions may be downloaded via computer networks such as the Internet, Intranet, etc.

The following examples pertain to further embodiments.

Example 1 is an electronic device comprising: a motor to operate at a first frequency during a first time period and to operate at a second frequency during a second time period, an accelerometer to obtain first data relating to operation of the motor at the first frequency and to obtain second data relating to operation of the motor at the second frequency, and a processor to determine a desired resonant frequency of the motor based on the first data and the second data.

In Example 2, the subject matter of Example 1 can optionally include a driver to control the motor.

In Example 3, the subject matter of Example 1 and Example 2 can optionally include that the driver to control the motor to operate the motor at the desired resonant frequency.

In Example 4, the subject matter of Example 1 can optionally include that the motor to provide a vibration at the electronic device.

In Example 5, the subject matter of Example 1 can optionally include that the accelerometer to obtain third data relating to operation of the motor at a third frequency.

In Example 6, the subject matter of Example 1 and Example 5 can optionally include that the processor to determine the desired resonant frequency based on the first data, the second data and the third data, and the processor to control the motor to operate at the determined desired resonant frequency.

In Example 7, the subject matter of Example 1 can optionally include that the motor is a linear resonant actuator device.

Example 8 is an electronic device comprising: means for providing a haptic event at a first frequency during a first time period and at a second frequency during a second time period, means for obtaining first data relating to operation of the means for providing at the first frequency and for obtaining second data relating to operation of the means for providing at the second frequency, and means for determining a desired resonant frequency of the means for providing based on the first data and the second data.

In Example 9, the subject matter of Example 8 can optionally include means for controlling the means for providing the haptic event.

In Example 10, the subject matter of Example 8 and Example 9 can optionally include that the means for controlling the means for providing to operate the means for providing at the desired resonant frequency.

In Example 11, the subject matter of Example 8 can optionally include that the haptic event is a vibration at the electronic device.

In Example 12, the subject matter of Example 8 can optionally include that the means for obtaining to further obtain third data relating to operation of the means for providing at a third frequency.

In Example 13, the subject matter of Example 8 and Example 12 can optionally include that the means for determining to determine the desired resonant frequency based on the first data, the second data and the third data.

In Example 14, the subject matter of Example 8 can optionally include that the means for providing is a linear resonant actuator device.

Example 15 is a method of an electronic device comprising: operating a motor of the electronic device at a first frequency, obtaining first data relating to operation of the motor operating at the first frequency, operating the motor at a second frequency, obtaining second data relating to operation of the motor operating at the second frequency, and determining a desired resonant frequency of the motor based on the first data and the second data.

In Example 16, the subject matter of Example 15 can optionally include operating the motor at the desired resonant frequency.

In Example 17, the subject matter of Example 15 and Example 16 can optionally include that operating the motor at the desired resonant frequency includes controlling a driver of the motor based on the determined desired resonant frequency.

In Example 18, the subject matter of Example 15 and Example 17 can optionally include that operating the motor at the desired resonant frequency includes providing a haptic event.

In Example 19, the subject matter of Example 15 and Example 18 can optionally include that providing the haptic event includes providing a vibration at the electronic device.

In Example 20, the subject matter of Example 15 can optionally include operating the motor at a third frequency, and obtaining third data relating to operation of the motor operating at the third frequency.

In Example 21, the subject matter of Example 15 and Example 20 can optionally include determining the desired resonant frequency of the motor based on the first data, the second data and the third data, and operating the motor at the determined desired resonant frequency.

In Example 22, the subject matter of Example 15 can optionally include that the motor is a linear resonant actuator device.

Example 23 is a non-transitory machine-readable medium comprising one or more instructions that when executed by a processor enable an electronic device to: operate a motor of an electronic device at a first frequency, obtain first data relating to operation of the motor operating at the first frequency, operate the motor at a second frequency, obtain second data relating to operation of the motor operating at the second frequency, and determine a desired resonant frequency of the motor based on the first data and the second data.

In Example 24, the subject matter of Example 23 can optionally include that further instructions that operate the motor at the desired resonant frequency.

In Example 25, the subject matter of Example 23 and Example 24 can optionally include that the further instructions that operate the motor at the desired resonant frequency includes instructions to control a driver of the motor based on the determined desired resonant frequency.

In Example 26, the subject matter of Example 23 and Example 25 can optionally include that the further instructions that operate the motor at the desired resonant frequency includes instructions to provide a haptic event.

In Example 27, the subject matter of Example 23 and Example 26 can optionally include that the haptic event is a vibration at the electronic device.

In Example 28, the subject matter of Example 23 can optionally include that further instructions that: operate the motor at a third frequency, obtain third data relating to operation of the motor operating at the third frequency.

In Example 29, the subject matter of Example 23 and Example 29 can optionally include that the instructions to determine the desired resonant frequency includes instructions to determine the resonant frequency of the motor based on the first data, the second data and the third data.

In Example 30, the subject matter of Example 23 and Example 29 can optionally include that further instructions that: operate the motor at the desired resonant frequency.

In Example 31, the subject matter of Example 23 can optionally include that the motor is a linear resonant actuator device.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a motor to operate at:
    a first frequency during a first time period,
    a second frequency during a second time period, and
    a third frequency during a third time period;
an accelerometer to obtain:
    first acceleration data relating to operation of the motor at the first frequency, second acceleration data relating to operation of the motor at the second frequency, and third acceleration data relating to the operation of the motor at the third frequency;
a processor to determine a new resonant frequency of the motor based on the first, second and third acceleration data; and
a driver to control the motor to operate at the new resonant frequency,
wherein the resonant frequency is the frequency at which acceleration of the motor is towards a maximum.

2. The electronic device of claim 1, wherein the motor is to provide a vibration at the electronic device.

3. The electronic device of claim 1, wherein the motor is a linear resonant actuator device.

4. The electronic device of claim 1, wherein the new resonant frequency is an optimal resonant frequency of the motor in its current state.

5. The electronic device of claim 4, wherein the optimal resonant frequency of the motor in its current state is the frequency at which acceleration of the motor is at or near a maximum.

6. An electronic device comprising:
means for providing a haptic event at a first frequency during a first time period, at a second frequency during a second time period, and at a third frequency during a third time period;
means for obtaining first acceleration data relating to operation of the means for providing at the first frequency, for obtaining second acceleration data relating to operation of the means for providing at the second frequency, and for obtaining third acceleration data relating to operation of the means for providing at the third frequency; and
means for determining a new resonant frequency of the means for providing based on the first data, the second data and the third data; and
means for controlling the means for providing the haptic event;
wherein the resonant frequency is the frequency at which acceleration of the means for providing is towards a maximum.

7. The electronic device of claim 6, wherein the means for controlling the means for providing is to operate the means for providing at the new resonant frequency.

8. The electronic device of claim 6, wherein the haptic event is a vibration at the electronic device.

9. The electronic device of claim 6, wherein the new resonant frequency is an optimal resonant frequency of the means for providing a haptic event in its current state.

10. The electronic device of claim 9, wherein the optimal resonant frequency of the means for providing a haptic event in its current state is the frequency at which acceleration of the means for providing a haptic event is at or near a maximum.

11. A method of an electronic device comprising:
operating a motor of the electronic device at a first frequency;
obtaining first acceleration data relating to the motor operating at the first frequency;
operating the motor at a second frequency;
obtaining second acceleration data relating to the motor operating at the second frequency;
operating the motor at a third frequency;
obtaining third acceleration data relating to the motor operating at the third frequency;
determining a new resonant frequency of the motor based on the first data, the second data and the third data; and
operating the motor at the new resonant frequency
wherein the resonant frequency is the frequency at which acceleration of the motor is towards a maximum.

12. The method of claim 11, wherein operating the motor at the new resonant frequency includes controlling a driver of the motor based on the determined new resonant frequency.

13. The method of claim 12, wherein operating the motor at the new resonant frequency includes providing a haptic event.

14. The method of claim 11, wherein the new resonant frequency is an optimal resonant frequency of the motor in its current state.

15. The method of claim 14, wherein the optimal resonant frequency of the motor in its current state is the frequency at which acceleration of the motor is at or near a maximum.

16. A non-transitory machine-readable medium comprising one or more instructions that when executed by a processor enable an electronic device to:
operate a motor of the electronic device at a first frequency;
obtain first acceleration data relating to operation of the motor operating at the first frequency;
operate the motor at a second frequency;
obtain second acceleration data relating to operation of the motor operating at the second frequency;

operate the motor at a third frequency;
obtain third acceleration data relating to operation of the motor operating at the third frequency;
determine a new resonant frequency of the motor based on the first data, the second data and the third data; and
control the motor to operate at the new resonant frequency,
wherein the resonant frequency is the frequency at which acceleration of the motor is towards a maximum.

17. The machine-readable medium of claim 16, wherein the instructions that operate the motor at the desired resonant frequency include instructions to provide a haptic event.

18. The machine-readable medium of claim 17, wherein the haptic event is a vibration at the electronic device.

19. The non-transitory machine-readable medium of claim 16, wherein the new resonant frequency is an optimal resonant frequency of the motor in its current state.

20. The non-transitory machine-readable medium of claim 19, wherein the optimal resonant frequency of the motor in its current state is the frequency at which accceleration of the motor is at or near a maximum.

* * * * *